No. 827,484. PATENTED JULY 31, 1906.
F. L. O. WADSWORTH.
METHOD OF MAKING PRISM GLASS.
APPLICATION FILED JUNE 28, 1904.
2 SHEETS—SHEET 1.
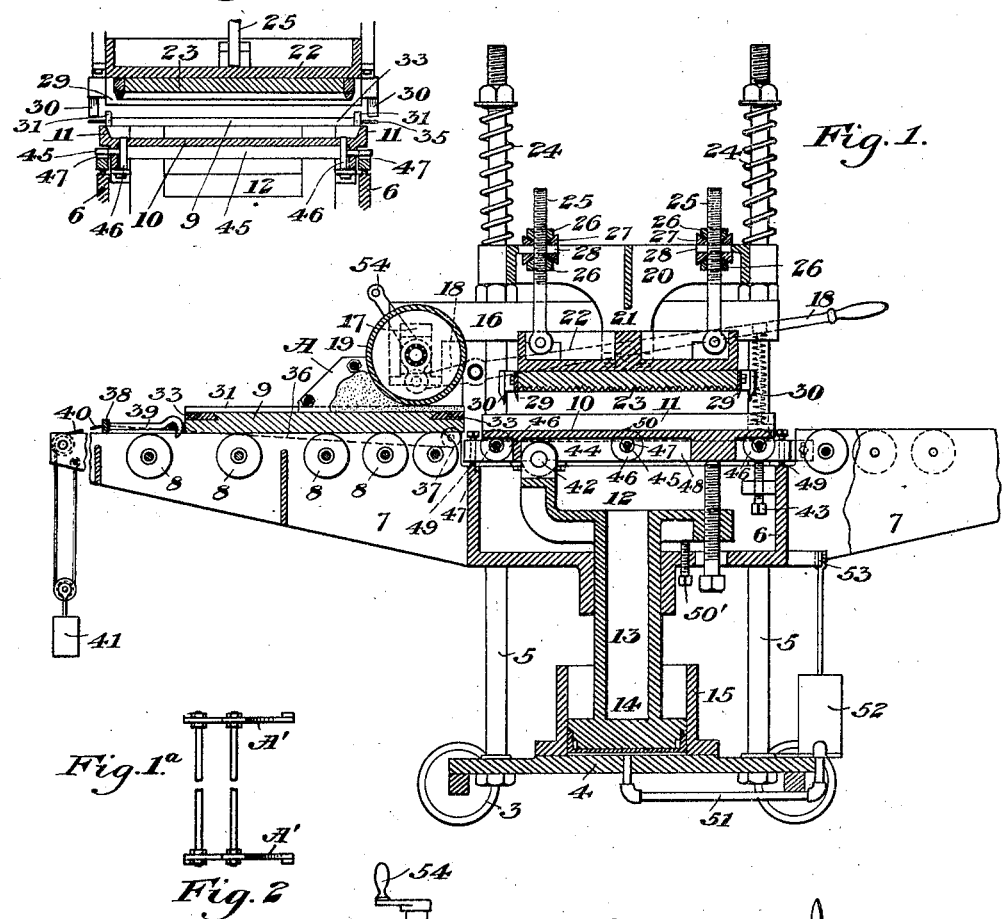
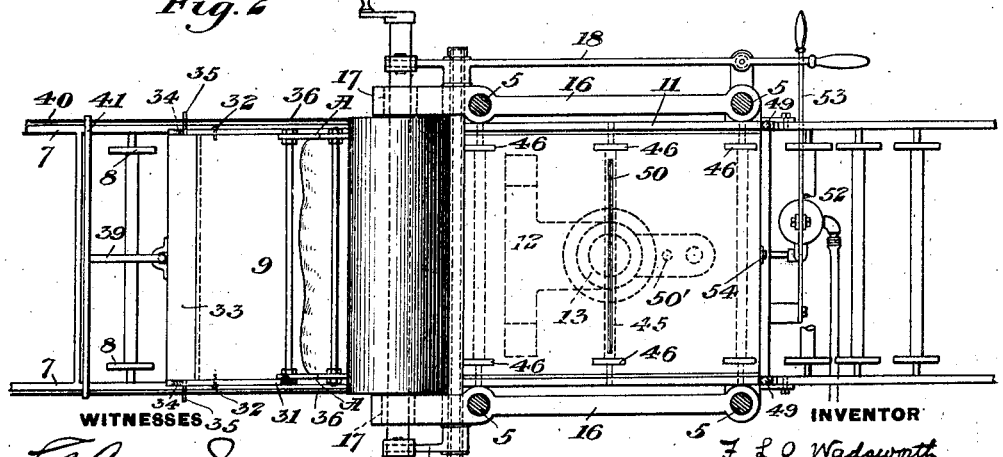
WITNESSES
INVENTOR
F. L. O. Wadsworth
by Bakewell & Byrnes
his attorneys No. 827,484.
PATENTED JULY 31, 1906.
F. L. O. WADSWORTH.
METHOD OF MAKING PRISM GLASS.
APPLICATION FILED JUNE 28, 1904.
2 SHEETS—SHEET 2.
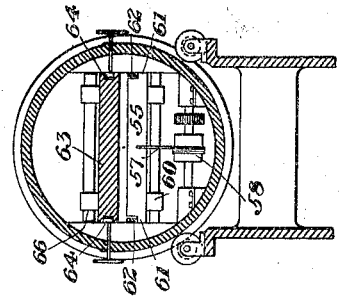
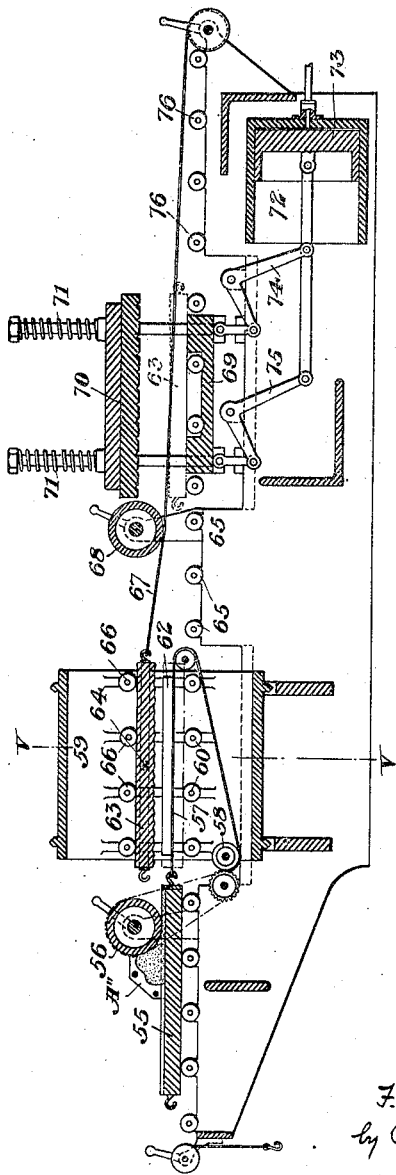
WITNESSES
INVENTOR
F. L. O. Wadsworth
by Bakewell & Byrnes
his attorneys

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

METHOD OF MAKING PRISM-GLASS.

No. 827,484.     Specification of Letters Patent.     Patented July 31, 1906.

Application filed June 28, 1904. Serial No. 214,442.

*To all whom it may concern:*

Be it known that I, FRANK L. O. WADSWORTH, of Morgantown, Monongalia county, West Virginia, have invented a new and useful Method of Making Prism-Glass, of which the following is a full, clear, and exact description, reference being had to the accompanying drawings, forming part of this specification, in which—

Figure 1 is a side elevation, partly in section, of one form of apparatus which I may employ in carrying out my invention. Fig. 1ª is a plan view of one of the guns I employ. Fig. 2 is a plan view of Fig. 1. Fig. 3 is a cross-section of a portion of the apparatus. Fig. 4 is a longitudinal section showing a modified form of apparatus which I may employ, and Fig 5 is a cross-section on the line V V of Fig. 4.

In the manufacture of sheets of prism-glass where the prism pattern is impressed upon a rolled glass sheet difficulty has been experienced in making such sheets of considerable thickness. When they are thick, the body of molten glass is very large and hot, and when the pressing-die is brought upon it the pattern-surface is apt to be injured by the heat and the operation is delayed by the necessity which exists of waiting for a considerable time after each pressing operation in order to permit the die to cool. It is also difficult to remove the sheet from the table and from the die. Moreover, the pattern produced in this manner is frequently defective, and owing to the thickness of the glass its surface will be different in temperature from the interior, and the glass is therefore apt to curl up when placed in the leer. Like difficulties are encountered in the manufacture of figured sheets of other forms wherever it is attempted to press the pattern upon the surface of a thick body of glass. The method which I have invented overcomes these difficulties and makes it possible to carry on the manufacture of glass sheets quickly and without injury to the apparatus, to anneal them without distortion, and to produce a perfect pattern.

In the practice of my invention instead of rolling the thick sheet in a single mass and then impressing the pattern upon it I roll it in two or more layers—that is to say, I first spread out upon the rolling-table a glass sheet of ordinary thickness, such as can be easily managed, and then I roll a second, and, if desired, a third sheet, and finally impress the pattern upon the glass. The interval or intervals between the formation of the sheets allows the successive layers of glass to cool somewhat, so that when the pattern is impressed the sheet is not unduly hot and the operation therefore does not result in injury to the die, nor does it make it difficult to form the pattern or to remove the sheet from the table. The cooling of the first layer of glass before the completion of the second also equalizes the temperature of the opposite surfaces, and when placed in the leer they will anneal without curling up.

In addition to the advantages already enumerated the pressing operation as herein described produces a further beneficial effect of compressing the two sheets of glass together with any interposed material that may be placed between them into a single homogeneous article of more uniform density and greater transparency than can be secured by simply rolling one sheet on top of another. On account of this fact the invention may be practiced even when the pressing-die has no pattern formed upon it and where the pressure is employed merely to render more compact a compound sheet having plain surfaces.

The manufacture can be conducted rapidly, and my invention possesses many other advantages which will be appreciated by those skilled in the art.

The method above described may be practiced in apparatus of many forms. The apparatus which I have shown in the drawings as preferable is constructed substantially as shown and described in the patent of Ripley and Wadsworth, No. 661,024, dated October 30, 1900, and I will now describe it.

The machine consists of a main frame, preferably portable, and mounted, as shown, on wheels 3, on which it can be moved on suitable tracks in front of the annealing-oven. This main frame is built up of a base-plate 4, which supports four heavy steel columns 5, and of a heavy box-shaped casting 6, supported on these columns. At each end of the frame are heavy vertical plates 7, suitably cross-braced, and between them are mounted small rollers 8, on which a movable spreading-table or platen 9 rolls. In the center of the box-shaped casting between the four vertical columns just mentioned is a table 10, the top surface of which is level with the top surface of the rollers 8 and which has side flanges 11, the top surface and side flanges being so shaped as to receive the platen 9. This supporting-table 10 may be set to different angles, and to this end suitable adjuncts are used. For instance, the table is pivotally mounted on a carrier (shown as a tripod-head 12) which is moved vertically by suitable mechanism. As shown, the head is carried on a piston-rod 13, connected with the piston 14, moving in a cylinder 15, mounted on the base-plate 4.

Above the table 10 and also supported by the side columns are mounted two bars 16 16, the ends of which project forward over the front end of the machine and are slotted, as at 17, to receive boxes which are adjustable vertically with reference to the platen 9 by means of a lever 18, engaging the bearings of the roller 19 and adapted to move them vertically in order to increase the vertical separation between the roll and the table when the second layer of the sheet is to be rolled.

Above the bars 16 and sliding freely on the side column is a frame 20, having at opposite sides two hangers 21, in which are pivoted the trunnions of a die-plate 22, which serve as the support for the upper die 23 of the machine. The frame 20 by the action of springs 24 is held down against adjustable stops on the columns 5. To hold the upper die 23 in proper relative position to the frame 20, screw-eyebolts 25 25 are provided, which are pivoted at the lower ends to bosses on the die-plate 22 and are clamped at the upper screw ends to the frame 20 by means of nuts 26 and washers 27, engaging on opposite sides of the slotted lugs 28, projecting from the frame 20. The upper die 23 is held to the die-plate 22 by means of bolts or set-screws and has at its sides two knife-edge cutters 29 29, projecting somewhat below the lower surfaces of the die, and also two projecting wedge-shaped pieces 30 30, the object of which will be explained hereinafter.

The platen 9 has a smooth under surface which rolls upon the surface of the rollers 8 8. It has side strips 31, which may be attached by means of screws 32, which pass through slots in the said strips and allow of a certain vertical adjustment of the latter, so that the top edges of these strips may be brought just in contact with the surface of the roller 19. At the ends of the table are strips 33 33, the top surfaces of which are flush with the surface of the platen 9. The inner edges of these strips are beveled, as shown, and are normally held in close contact with the edge of the recess in the table by means of springs 34, and at the ends of the strips are pins 35, which project through slots in the side plates 31.

In order to move the platen 9 under the roller 19 at the same speed at which the surface of the latter revolves, two steel cords or tapes 36 are wrapped around the ends of the roller, pass over idle pulleys 37 on the frame of the machine, and backward to a cross-bar 38, which slides on the main frame of the machine, and has at the center a pin 39, which hooks into the end of the platen 9. To keep the cords 36 taut, a second cord 40 is continued back to the end of the frame and there attached to a weight 41, as shown, or to a spring or some equivalent device.

The central table 10 is supported when in its lower position on the roller-bearing 42 of the tripod 12 and on the adjustable bearings 43, (shown as screws,) set normally at such a height that the top surface of said table is on a line with the top surface of the rollers 8 8, already described. Through the side ribs 44 of the said table are holes through which pass loosely the ends of journals or shafts 45 of rollers 46. The ends of the shafts 45 rest when the table is down in V-shaped notches 47 in two bars 48, which are adjusted to such a height by means of screws 49 that the top surfaces of the rollers 46 are then just above the surface of the table 10. When, therefore, the table is in this position and the platen 9 is moved forward upon it, it rolls easily upon these rollers; but as soon as the table 10 is lifted above this position, carrying the rollers 46 with it, the ends of the shafts 45 are lifted out of the notches in the bars 48, allowing the rollers to descend slightly and the platen 9 to settle down into contact with the table 10, it being held in proper relation thereto by means of the beveled side flanges 11 and also small bevel projections 50, running across the lower surface of the table at right angles to these side pieces. Any other suitable steadying devices may be used.

Through the lower plates of the box-shaped casting 6 projects a screw 50', which serves as a stop to hold the tripod-head and its attached table 10 at the proper height.

Connected with the cylinder 15 is a pipe 51, communicating with the valve-casing 52, by means of which air can be admitted or allowed to escape from the cylinder 15 by manipulating the valve by means of the valve-lever 53.

The roll 19, carrying with it in rotation the platen 9, is rotated by means of a crank 54 or equivalent device in the case of a small machine or by means of an electric or other motor geared thereto in the case of a larger one.

In operating the machine I proceed as follows: I first adjust the height of roller 19 by shifting its bearings, by means of the lever 18, to such a distance from the surface of the platen 9 as will produce the first sheet of glass of the required thickness, the side strips 31 on the table being adjusted to such a height that they are just in contact with the lower surface of the roller, as already described. The platen 9 is run back to a position in which it is entirely from under the roller 19 and a pair of guns A of the usual construction placed in front of the roller. Molten glass is then poured upon the end of the platen between the guns next to the roller, as in making ordinary plate-glass. The roller 19 is then caused to spread out the glass deposited thereon into a sheet of the required thickness, and the operation is continued until the platen has passed entirely under the roller. The pair of guns A is then removed, the lever 18 depressed, so as to raise the roller slightly, and the platen then retracted to its original position by means of the weight 41. A second pair of guns A' of such width as to rest directly on the side strips, is then placed in position, and another body of molten glass is poured between them next to the roller and directly on the sheet of glass first rolled. The roller is again caused to spread out the second body of glass in a layer upon the layer first formed, thus making a sheet of increased thickness. At the end of the rolling of the second layer of glass the platen rests upon the top of the table 10 in proper position for the V-shaped projections on the latter to engage with the corresponding grooves in the platen. The valve-lever 53 is now depressed to admit air to the cylinder 15 and raise the head and the attached table toward the die 23. This forces the glass into the cavities of the die and brings the glass into contact with every portion of the said cavities, thus molding, shaping, and finishing the glass into prism form. In order that there may be intimate contact between the die and the glass within the cavities, I vent each of the cavities by causing it to communicate with the atmosphere. In the die which I have shown, where the prism-forming cavities extend across the face of the die in parallel position, the end of each cavity is formed with a hole or is left open, thus providing the needed air-vent. At the same time with the descent of the upper die the wedge-shaped pieces 30 engage the pins 35 35 of the strips 33 as the table rises and forces the latter strips outward, leaving openings into which the cutters 29 descend, and indent or shear off the rough ends of the glass. After the glass has remained in contact with the upper die long enough to set the valve-lever 53 is released, allowing the air to escape from the cylinder 15 and the table to descend to its lowest position. The stop 54 is then turned and the hook 39 disengaged, so as to allow the platen 9 to be drawn through to the end of the machine opposite that at which it is entered. The machine is so placed that the glass sheet may then be removed directly from this table by suitable means and placed in the annealing-oven. The platen 9 is then run back to its first position and is ready for the repetition of the operation.

In Figs. 3 and 4 I show a modified construction of my apparatus, in which I illustrate other means by which the combined glass sheet may be rolled and manipulated. In this case the table 55 is provided with a gun A" of usual construction, and the table is adapted to be pulled under the roll 56 by a rope 57, which winds upon a drum 58, the latter being driven by sprocket mechanism from the roll 56. By means of this chain the table is drawn under the roll and carries the sheet into a rotating cylindrical frame 59, in which it is supported by rollers 60 and is held in place by flanges 61 on the frame engaging tongues 62 on the table. When the table is within the frame, a second table 63, which is also supported within the frame by eccentrics 64, is lowered upon the glass by turning the eccentrics. The frame is then rotated on its longitudinal axis through one hundred and eighty degrees, so as to reverse the positions of the tables 55 and 63 and to bring the table 55 uppermost and the table 63 directly above the rollers 66. The table 63, carrying the glass, is then lowered upon the rollers 66 by reversing the eccentrics, the table 55 being meanwhile supported by the tongues 62 and flanges 61, and the table 63 is then drawn, by means of a chain 67, out of the cylindrical frame 59 and under a second roller 68. A second ladle of glass is then poured upon the top of the first sheet in front of the second roll, and the motion being continued the table is drawn under the second roll and the second sheet of glass is rolled down upon the first. The motion being further continued, the table with the double sheet of glass is drawn upon a pressing-head 69, which is vertically movable in a frame carrying a pressing-die 70, backed by springs 71, the motive power being supplied by a cylinder 72 and piston 73, connected with the head by levers 74 and 75. When the piston 73 is projected, the pressing-head 69 is raised with the table 63, thus bringing the glass into contact with the pressing-die 70, pressing the two sheets of glass into intimate contact and impressing the pattern of the die 70 and table 63 upon the opposite faces of the glass. The head 69 may then be lowered, the table 63 pulled forward upon rollers 76, where the glass may be removed, and the table then pushed back within the cylindrical frame 59, the latter turned back one hundred and eighty degrees and the table 55 pushed to the rear of the roll 56 to receive another charge of glass.

The inversion of the first layer of the compound sheet accomplishes a specific purpose of great advantage, since it makes possible the production of a compound sheet neither surface of which is originally formed in contact with the table. It is well known that the table-surface of a glass sheet is inferior to the other surface, and by the inversion of the first layer I obtain a sheet both surfaces of which have the gloss and finish which ordinarily belongs to the upper surface only of a rolled or pressed sheet.

I claim—

1. The method herein described of making glass sheets which consists in rolling a sheet in successively-formed layers and then subjecting the compound sheet to pressure acting upon the entire cross-section of the plate between the pressure-applying surfaces; substantially as described.

2. The method herein described of making sheet-glass, which consists in forming a sheet or layer of glass, inverting it, then forming thereon a second layer and then pressing the surface of the compound sheet thus formed whereby both surfaces of such sheet have a similar gloss or finish; substantially as described.

3. The method herein described of making glass sheets which consists in rolling a sheet in successive formed layers and then forming thereon a figured surface by pressure applied to the entire cross-section of that portion of of the plate to be figured; substantially as described.

4. The method herein described of making glass sheets which consists in forming a sheet or layer of glass, inverting it and then forming a second layer of glass thereon, both surfaces of the compound sheet thus formed having a similar gloss or finish; substantially as described.

In testimony whereof I have hereunto set my hand.

FRANK L. O. WADSWORTH.

Witnesses:
LINDSAY B. H. PEDDICORD,
N. M. GRIFFIN.